Patented Aug. 28, 1945

2,383,606

UNITED STATES PATENT OFFICE 2,383,606

CONDENSATION PRODUCTS AND METHOD OF PREPARING AND USING THE SAME

Eugene Lieber, Staten Island, and Marvin E. Thorner, Brooklyn, N. Y., assignors to Standard Oil Development Company, a corporation of Delaware No Drawing. Application July 25, 1940, Serial No. 347,485

7 Claims. (Cl. 252—59)

This invention relates to novel condensation products and to methods of preparing and using same, and more particularly it relates to a novel method of making condensation products which have wax modifying properties and which are especially suitable for use as pour depressors in waxy mineral lubricating oils.

The prior art has taught that high molecular weight aliphatic hydrocarbon groups are essential for the preparation of pour depressors. For instance, in the Davis U. S. Patent 1,815,022 the types of materials to be used are described as containing relatively long aliphatic hydrocarbon chains, mentioning paraffin wax specifically. In the Peski U. S. Patent 2,073,080, it is suggested that alternatives for paraffin wax for preparing pour depressors, include petroleum fractions with appreciable content of higher paraffinic hydrocarbons. Also in the Gleason U. S. Patent 2,106,247 it is proposed to use oxygen containing aliphatic materials, such as alcohols, which contain relatively long hydrocarbon chains, e. g., containing 10 or 12 carbon atoms at least, and preferably even more.

Quite at variance with the above teachings of the prior art, it has now been found that a new type of pour depressor can be prepared without using any compounds containing long hydrocarbon chains, and in fact even without using any aliphatic compound at all.

Broadly, the invention comprises chemically condensing cyclic alcohols with aromatic compounds in the presence of suitable catalysts, to produce relatively high molecular weight condensation products which have wax modifying properties and may be used to particular advantage as pour depressors in waxy lubricating oil.

The cyclic alcohol which may be used in the practice of this invention can be represented generically by the formula $X_m$—R—$(OH)_n$, where R is an alicyclic radical and/or a saturated heterocyclic radical, X is a substituent such as hydrogen, halogen, amino, alkoxy, carbalkoxy, alkyl, aralkyl, etc., $m$ and $n$ are integers of 1 or more, preferably not more than 3. The substituent group X should be of low molecular weight, e. g., if alkyl groups not more than 7 carbon atoms and preferably less. Typical examples of this class of alcohols are: cyclopropanol, cyclobutanol, cyclopentanol, cyclohexanol, methylcyclohexanol, dimethylcyclohexanol, ethyl-cyclohexanol, hexylcyclohexanol, decanols, tertahydrofurfuryl alcohol, etc. The substituent or substituents X may be attached to the cyclic group R in various positions in respect to the alcohol group or groups. For instance, in the case of methylcyclohexanol (which might otherwise be termed hydrogenated cresol) the methyl and hydroxy groups may be in ortho, meta or para positions. These various cyclic alcohols can be used either singly or in mixtures, and either commercial grades or pure materials may be used. From a practical point of view, in the case of substances where substituent groups may be present in various positions, such as in the case of the methylcyclohexanol, as discussed above, it is desirable to use the crude commercial product which in most cases contains a mixture of the substances containing the substituent groups in all of the possible positions.

The aromatic compounds to be used according to the present invention are preferably selected from the group consisting of the aromatic hydrocarbons themselves and the oxy-aromatic compounds such as the hydroxy or phenolic derivatives of aromatic hydrocarbons. Examples of some of the aromatic hydrocarbons per se which can be used include naphthalene, anthracene, phenanthrene, fluorene, diphenyl, benzene, toluene, xylene, and the like, or mixtures of these. The oxyaromatic compounds which may be used, either in place of the aromatic hydrocarbons or in admixture therewith, may include: phenol, benzyl phenol, resorcinol, o-hydroxydiphenyl, b-naphthol, p-cresol, hydroquinone, catechol, xylenol, methyl hydroxydiphenol, guaiacol, the monoethylether of catechol, methyl naphthol, tolyl naphthol, xylyl naphthol, benzyl naphthol, methoxy hydroxy naphthalene, anthrazole and the like.

The proportions in which these two reagents, namely the cyclic alcohols and the aromatic compounds, are to be reacted, may vary over a fairly wide range, depending upon the nature of the material to be used, the cost of the various materials, the degree of potency desired in the finished product, and other factors which will be apparent to those skilled in the art. Usually, however, these two reagents are mixed in simple molecular proportions, generally using about ½ to 10 mols of the cyclic alcohol to 1 mol of the aromatic compound, although preferably the ratio should be about 1 to 5 mols of the cyclic alcohol to 1 mol of the aromatic compound.

Although it is not essential, it is desirable that a solvent be used and this should be inert to the reaction. Suitable solvents include kerosene which has been strongly pretreated with sulfuric acid or aluminum chloride before use to make it inert, carbon disulfide, tetrachlorethane, nitrobenzene, dichlorbenzene, and others. The amount of the solvent, if used at all, should be generally about 0.5 to 10 volumes, or preferably 1 to 5 volumes of solvent per 1 volume of the mixture of cyclic alcohol and aromatic compound.

The catalyst to be used in order to effect the chemical condensation of the reagent, may be any of the well-known Friedel-Crafts catalysts, such as aluminum chloride, ferric chloride, zinc chloride, boron fluoride and others of this class. Other types of catalysts may be used such as sulfuric acid, phosphoric acid, phosphorous pentoxide, hydrogen fluoride, etc. Of these various catalysts aluminum chloride is preferred and it should, of course, preferably be anhydrous.

In carrying out the present invention, one of the simplest procedures to use is to mix the cyclic alcohol and the aromatic compound, together with the solvent if one is used, and then slowly add the catalyst with stirring, and with cooling if necessary to prevent undesirably high increase in temperature. After the addition of the catalyst, the reaction mixture is preferably heated to about 150 or 200° F. or even 250° F., and maintained thereat for several hours, or until the condensation is substantially complete. The amount of heating, however, should no be sufficient to produce solid rubbery condensation products which are insoluble in mineral oils.

If desired, other methods of mixing the reagents may be used, for example, the aromatic compound and cyclic alcohol may be mixed together to form a solution or suspension which may then be added to a solution or suspension of the catalyst in an appropriate solvent. A further alternative procedure is to mix one of the reagents, such as the naphthalene, with the catalyst and solvent, and then gradually add the other reagent.

In any case, after an appropriate reaction time, the mixture is cooled, e. g., to about 100° F. or so, and diluted, usually with a refined kerosene, and then the catalyst is rendered inert by appropriate means, as for instance by hydrolysis with water and alcohol or a mixture of water and alcohol or with an aqueous solution of caustic soda. The mixture is then allowed to settle and the aqueous layer containing the sludge resulting from hydrolysis of the catalyst is drawn off and discarded. The kerosene extract is then distilled as with fire and steam to about 600° F., in order to remove solvent and low boiling products. The bottoms residue so obtained constitutes the desired condensation products having pour depressing properties.

The high boiling condensation products of this invention generally ranges in consistency from a viscous oil to a resin, its color usually ranges from a green to a brown. This product has the property of modifying the crystal structure of waxes such as paraffin wax, and is particularly useful for modifying the crystal structure of the waxy constituents in waxy lubricating oil, such as a Pennsylvania type lubricating oil or other oils high in paraffinic hydrocarbons and having a relatively high pour point. When a small amount, such as .05 to 10% and preferably .02 to 5%, of this new condensation product is added to such waxy lubricating oil, the resultant blend will have a substantially lower pour point; in other words, this wax modifier is an effective pour depressor for waxy oils. A small amount of this wax modifier is also useful as dewaxing aid for removing wax for mineral lubricating oils of undesirably high wax content. In similarly small amounts, this wax modifier may also be incorporated into paraffin wax or compositions containing the same, to be used for various purposes such as for coating or impregnating paper, etc. or for making various molded wax products.

For the sake of illustration but without desiring to limit the invention to the particular materials used, the following examples of experimental data are given.

*Example 1*

One hundred twenty-eight grams of naphthalene and 275 grams of anhydrous aluminum chloride were suspended in 300 cc. of kerosene (pretreated with $AlCl_3$ before use) as solvent and placed in a 3-liter-4-neck round bottom flask fitted with a mechanical stirrer, thermometer, reflux condenser and dropping funnel and cooled by a stream of running tap-water. The stirrer was started and 100 grams of cyclo-hexanol (hexahydrophenol) were slowly added, drop by drop, to the reaction mixture, by means of the dropping funnel. Forty-five minutes were required to add the cyclohexanol while maintaining the reaction temperature at 80–90° F. After the addition of the cyclohexanol, the reaction temperature was increased to 190° F. and maintained thereat for 3 hours. After cooling to about 120° F., the reaction mixture was diluted further with kerosene and the aluminum chloride decomposed by slowly adding 1 liter of water. After settling, the aqueous layer containing the aluminum sludge was drawn off and discarded. The kerosene extract, after washing further with water, was distilled with fire and steam to 600° F., in order to remove solvent and low-boiling products. A bottoms residue comprising 121 grams of a very viscous green oil was obtained as product.

When 2% of this condensation product was added to a waxy oil, the pour point of which was +30° F., the pour point was found to be 0° F.

*Example 2*

The following reagents were used in the proportions indicated:

| | |
|---|---|
| Naphthalene | grams__ 64 |
| Cyclohexanol | do____ 100 |
| $AlCl_3$ | do____ 275 |
| Tetrachlorethane as solvent | cc__ 300 |

The procedure for carrying out the reaction was the same as described in Example 1. The product was recovered as before by cooling the reaction mixture, diluting with kerosene and decomposing the $AlCl_3$ with water. After settling, the kerosene extract was distilled with fire and steam to 600° F. in order to remove solvent and low-boiling products. A bottoms residue comprising 119 grams of a dark green resinous substance was obtained as product.

When 2% of this condensation product was added to a waxy oil, the pour point of which was +30° F., the pour point was found to be −10° F.

*Example 3*

The following reagents were taken in the proportions indicated:

| | |
|---|---|
| Phenol | grams__ 94 |
| Cyclohexanol | do____ 100 |
| $AlCl_3$ | do____ 275 |
| Kerosene as solvent | cc__ 300 |

The procedure for carrying out the reaction was the same as described in Example 1. The product was recovered as before by cooling the reaction mixture, diluting with kerosene and decomposing the AlCl₃ with water. After settling, the kerosene extract was distilled with fire and steam to 600° F., in order to remove solvent and low-boiling products. A bottoms residue comprising 48 grams of a viscous stringy green oil was obtained as product.

When 2% of this condensation product was added to a waxy oil, the pour point of which was +30° F., the pour point was found to be −5° F.

It is not intended that this invention be limited to any of the specific examples which are given merely for the sake of illustration nor to any theory as to the mechanism of the operation of the invention, but only by the appended claims in which it is intended to claim all novelty inherent in the invention as broadly as the prior art permits.

We claim:

1. A lubricant comprising a major proportion of a waxy mineral lubricating oil and a minor amount of a pour depressor consisting essentially of a Friedel-Crafts condensation product of the monohydroxy derivatives of compounds selected from the group consisting of mono- and dinuclear saturated cyclic hydrocarbons and alkyl derivatives thereof containing less than 7 aliphatic non-cyclic carbon atoms per molecule, with an aromatic compound selected from the group consisting of aromatic hydrocarbons having less than 4 aromatic nuclei and hydroxy derivatives thereof, said condensation product being substantially non-volatile at about 600° F. and being soluble in mineral oil.

2. A lubricant comprising a major proportion of a waxy mineral lubricating oil and about 0.1 to 10.0% of a pour depressor consisting essentially of a Friedel-Crafts condensation product of 1 to 5 mols of cyclohexanol and 1 mol of naphthalene.

3. The process of preparing a lubricating composition which comprises subjecting a cyclic alcohol and an aromatic compound selected from the group consisting of aromatic hydrocarbons and hydroxy derivatives thereof, to a Friedel-Crafts condensation at a temperature between the approximate limits of room temperature and about 250° F. to produce a condensation product substantially non-volatile at about 600° F. and soluble in mineral lubricating oils and having the property of depressing the pour point of waxy mineral oils when added thereto in small amounts, hydrolyzing and removing residual catalyst from the reaction product, distilling the reaction product with fire and steam to about 600° F. and incorporating a small amount of the distillation residue into a major proportion of waxy mineral lubricating oil.

4. Lubricant according to claim 1 in which the pour depressor is made from cyclohexanol.

5. Lubricant according to claim 1 in which the pour depressor is made from naphthalene.

6. Lubricant comprising a major proportion of a waxy mineral lubricating oil and about 0.1 to 10.0% of a pour depressor consisting essentially of a Friedel-Crafts condensation product of phenol and cyclohexanol.

7. A lubricating composition comprising a major proportion of a waxy mineral lubricating oil and a small but pour depressing amount of a Friedel-Crafts condensation product of a saturated cyclic alcohol and an aromatic compound, said condensation product being substantially non-volatile at about 600° F. and having pour depressing properties.

EUGENE LIEBER.
MARVIN E. THORNER.